United States Patent [19]

Semenenko

[11] Patent Number: 5,036,894
[45] Date of Patent: Aug. 6, 1991

[54] MATERIAL HANDLING SYSTEM
[75] Inventor: Ivan Semenenko, Moreton-In-Marsh, England
[73] Assignee: Matcom Limited, Gloucestershire, England
[21] Appl. No.: 466,769
[22] Filed: Jan. 18, 1990
[30] Foreign Application Priority Data Jan. 23, 1989 [GB] United Kingdom ............... 8901382

[51] Int. Cl.$^5$ .................. B65B 1/04; B65B 3/00
[52] U.S. Cl. ................... 141/346; 251/363; 251/357; 141/368; 141/387; 141/363; 141/287
[58] Field of Search ............... 141/346, 363–369, 141/351–354, 357, 387, 287; 220/85 P; 277/34, 58; 251/363, 357

[56] References Cited

U.S. PATENT DOCUMENTS

| | | | |
|---|---|---|---|
| 3,042,085 | 7/1962 | Morris | 141/353 |
| 3,123,107 | 3/1964 | Kappler | 141/363 |
| 3,543,814 | 12/1970 | Aluotto | 141/352 |
| 3,970,123 | 7/1976 | Poulton et al. | 141/351 |
| 3,971,493 | 7/1976 | Williams | 141/363 |
| 4,703,782 | 11/1987 | Henkel, Sr. | 141/65 |
| 4,724,874 | 2/1988 | Parikh et al. | 141/98 |
| 4,874,023 | 10/1989 | Ulm | 141/346 |
| 4,924,922 | 5/1990 | Johnson | 141/346 |

FOREIGN PATENT DOCUMENTS 1188882 3/1965 Fed. Rep. of Germany .
2084969B 12/1984 United Kingdom .
2212788 8/1989 United Kingdom .

Primary Examiner—Henry J. Recla
Assistant Examiner—Keith Kupferschmid
Attorney, Agent, or Firm—Shapiro and Shapiro

[57] ABSTRACT

An intermediate bulk container (I.B.C.) system for handling a flowable material such as a pharmaceutical powder comprises, a discharge station, a transportable station for holding and transporting the powder, and a seal arrangement of the two stations, the seal arrangement being such that seals thereof cooperate one with the other and with the stations, whereby exposure of external surfaces of the system to the powder is obviated during discharge at the discharge station and during transport, so that no powder can escape from the interior to the exterior in use.

7 Claims, 3 Drawing Sheets

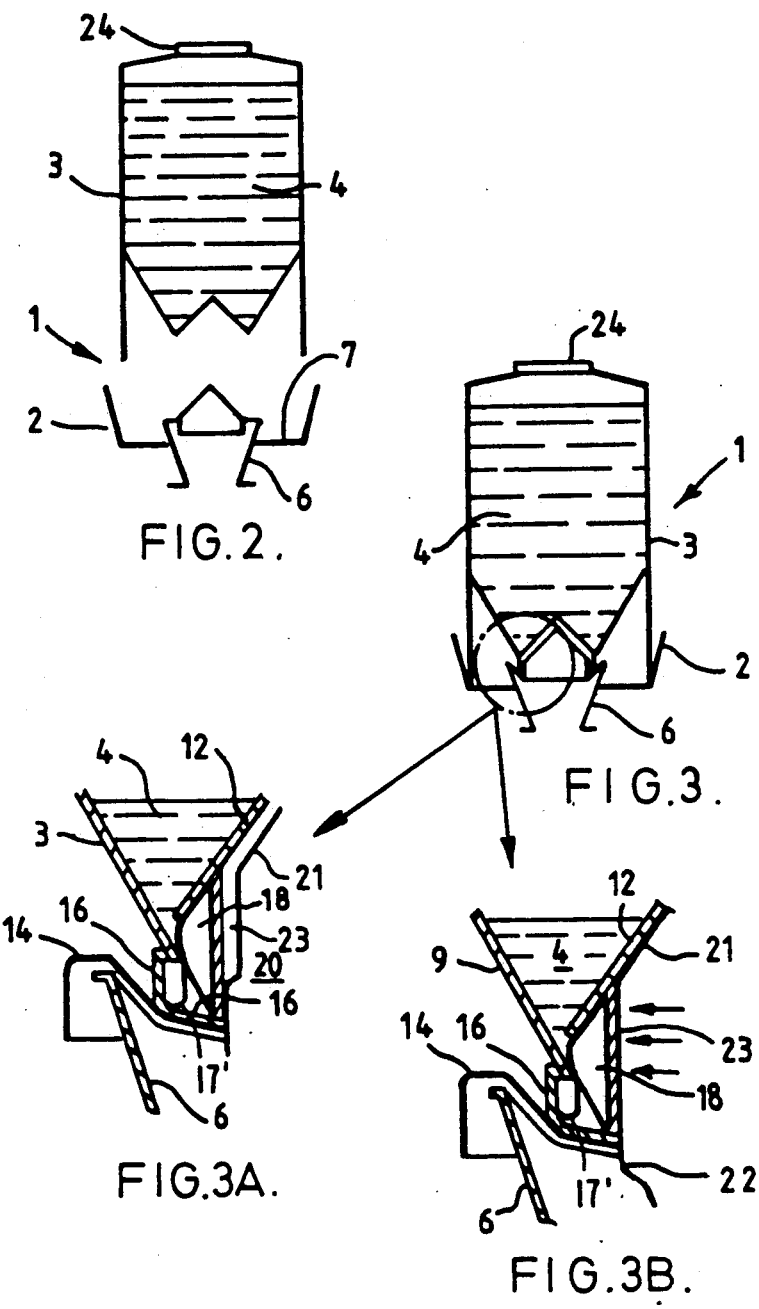

MATERIAL HANDLING SYSTEM

The invention relates to a material handling system, for example an intermediate bulk container (I.B.C.) system which is used to handle flowable material such as powders, pellets, slurries and the like.

Such a system usually has a fixed discharge station comprising a chute down which particulate material flows from a transportable station, bin or container which holds, transports and discharges the flowable material. The bin usually has an inlet and an outlet, the outlet being normally obturated against flow of material by a conical or frustoconical valve which sits on its base or rim on a converging exit throat at the outlet. When the outlet and chute are aligned, material can flow into the discharge station when the valve is raised off the exit throat by a suitable lifting device such as a bellows or complementary cone valve of the discharge station. One such device is that sold under the Registered Trade Mark "MATCON" and subject of U.K. Patent No. 2084969 B. Such systems work very well, but they suffer from a disadvantage, namely that particles of the flowable material can adhere to the transport station and the discharge station on respective surfaces thereof which when the transport station is removed from the discharge station are exposed to the surrounding atmosphere. This can be a disadvantage where the flowable material creates dust and is of a 'sensitive' nature, that is one which is not normally exposed to the atmosphere for fear of contamination or pollution. Thus a pharmaceutical powder is often one such, where dust particles of 2 parts per million are considered excessive in the atmosphere. Existing systems cannot prevent such contamination or pollution.

It is accordingly an object of the invention to seek to mitigate this disadvantage.

According to one aspect of the invention there is provided a system for handling flowable material, comprising a discharge station, a transportable station for holding and transporting the material, and seal means of the two stations, the arrangement of the seal means being such that exposure of external surfaces of the system to the material is obviated during discharge and transport.

The discharge station may comprise a chute or hopper and there may be seal means secured at or adjacent a free edge of the chute or hopper.

The seal means may comprise a resilient annular seal member extending into the chute or hopper.

The transportable station may comprise an outlet defined by a throat and there may be seal means secured at or adjacent a free edge of the throat.

The seal means may comprise a resilient annular seal member extending towards the outlet.

The discharge station may have means to seal an exterior, in use, surface of an obturating device of the transportable station.

The obturating device sealing means may comprise an inflatable device carried by a lifting device of the discharge station.

The inflatable device may be a pneumatic toroidal device.

The obturating device may comprise a seal device for sealing the interior of the outlet when in an obturating position therein.

The sealing device may comprise a toroidal soft sponge device.

According to a second aspect of the invention there is provided a set of parts for providing a system for handling flowable material, comprising a discharge station, a transportable station for holding and transporting the material, and respective seal means of the stations, the transportable station being mountable on the discharge station, the arrangement of the seal means being such that exposure of external surfaces of the system to the material is obviated during discharge and transport.

According to a third aspect of the invention there is provided a discharge station for use in a system for handling flowable material, comprising a lifting device adapted for lifting an obturating device at the outlet of a transportable station and seal means, the arrangement of the seal means being such that exposure of external surfaces of the discharge station to the material is obviated during discharge.

According to a fourth aspect of the invention there is provided a transportable station for use in a system for handling flowable material, comprising an outlet throat for material, an obturating device at the throat movable between an obturating position and a position allowing material flow out of the transportable container, and seal means, the arrangement of the seal means being such that exposure of external surfaces of the station to the material is obviated during discharge and transport.

A system embodying the invention is hereinafter described, by way of example, with reference to the accompanying drawings.

FIG. 2 is, to a scale reduced from that of FIG. 1, a schematic elevational view of a system according to the invention including a transportable station or Intermediate Bulk Container being offered up to a discharge station which is also part of the system;

FIG. 3 is a view, similar to that of FIG. 2, of the I.B.C. mounted on the outlet station;

FIGS. 3A and 3B are enlarged views of the part of FIG. 3 highlighted by a circle;

Figure 1:
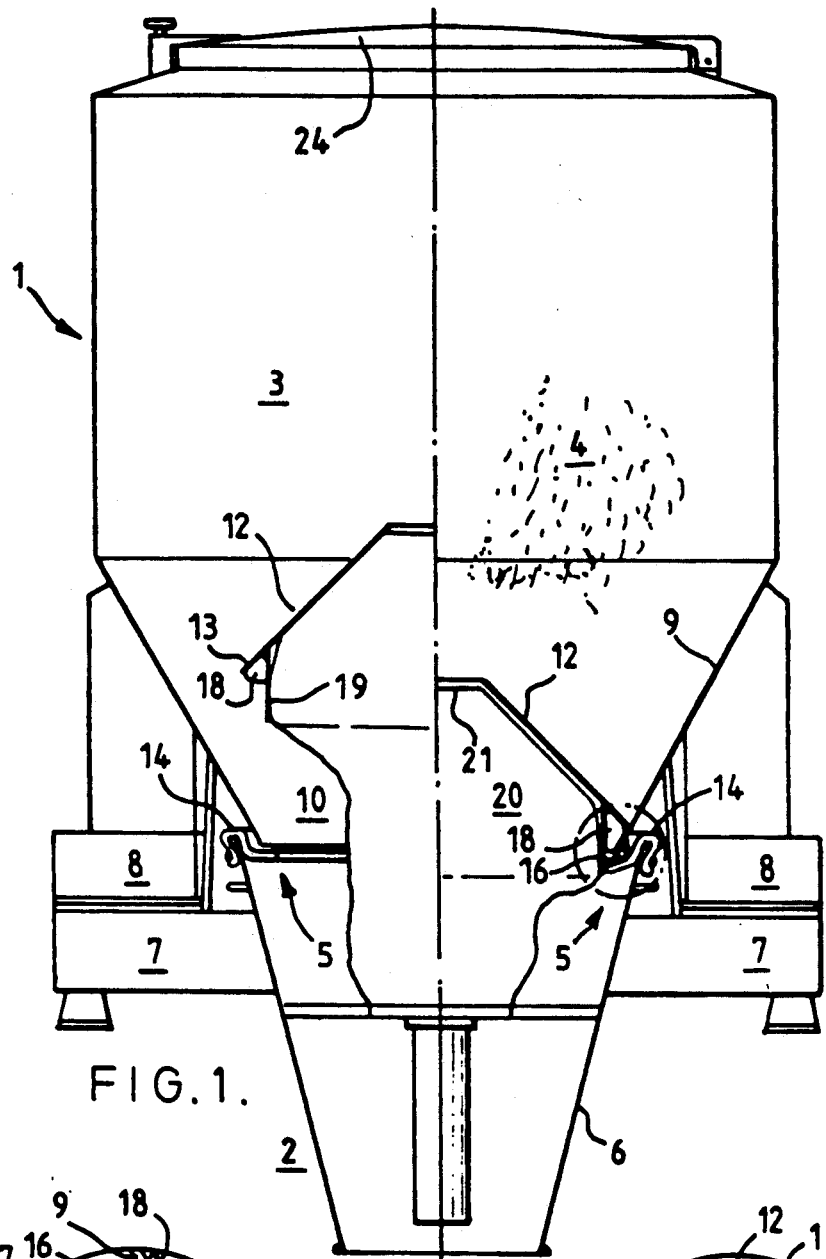
FIG. 1 is a schematic partly cross-sectional view of an I.B.C. system according to the invention.

Referring to the drawings there is shown a system 1 for handling flowable material, comprising a discharge station 2, a transportable station or I.B.C. 3 for holding and transporting flowable material such as powder 4 and discharging it at the discharge station 2, and seal means 5 of the two stations 2 and 3, the arrangement being such that the seal means isolates the interior of the system from the exterior during storage, transport and discharge.

The discharge station 2 comprises a fixed chute or hopper 6 mounted on a framework 7 which extends to either side thereof to provide a support for fork channel guides or feet 8 of the transportable station 3 which is in the form of a bin or I.B.C. having a throat 9 leading to an outlet 10 the throat/outlet 9, 10 being sized to fit into an opening bounded by the upper (as viewed) free edge 11 of the chute 6.

Figure 1B:
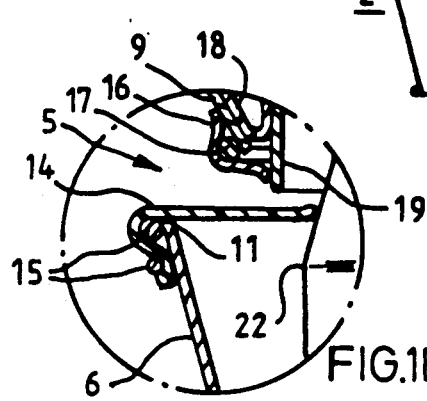
FIG. 1B is an enlarged detail showing the I.B.C. container just leaving the discharge station.
Figure 1A:
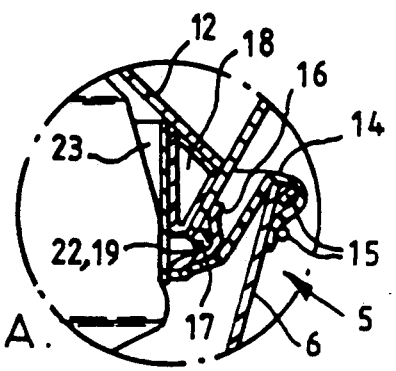
FIG. 1A is an enlarged detail showing mounting of an I.B.C. container at a discharge station in the system of FIG. 1.

The outlet 10 is normally obturated by a captive frustoconical valve member 12 which has an obturating position as shown at the right side of FIG. 1 and in FIG. 1A, and a raised or open position as shown at the left side of FIG. 1 to create an annular passage between a free edge or rim 13 thereof and the adjacent wall of the throat 9, flowable material 4 being enabled to flow out of the station 3 through the annular passage to the chute 6 and thence on to further processing. The free edge or rim 13 of the cone or valve member 12 rests on the wall of the throat 9 in the obturating position (FIG. 1) to close the outlet 10 against flow of material therethrough.

The seal means 5 comprises a flexible and resilient annular seal means or member 14 secured to the free edge or lip 11 of the chute 6 by metal clips 15, and a flexible and resilient annular seal means or member 16 secured to the free edge of the throat 9 of the bin 3, being formed into a 'V'-shape by a suitable annular member such as 17 in FIGS. 1A and B, or 17' in FIGS. 3A and B, 4A and 5A. There is also a toroidal or annular soft sponge, say rubber, seal 18 mounted at the under surface (as viewed) of the cone 12 between that surface adjacent the free edge 13 and a depending cylindrical wall 19 thereof. The seals 14, 16 may be of rubber, say neoprene.

The cone 12 is reciprocated between the obturating and 'open' positions by a vibratory lifting device 20 including a bellows means and a vibrator (not shown), for example like that described in U.K. Patent No. 2084969B. The lifting device 20 comprises a cone or frusto-cone 21 which has a depending wall 22 concentric therewith (and, in use, with the wall 19), the wall 22 mounting an inflatable, suitably pneumatic, toroidal seal 23 on its external periphery which is connectable with a source of air under pressure. The source also provides air for inflating the bellows and vibrating the vibrator, but as the source and conduiting therefrom form no part of the invention per se, they are not described further herein.

Figure 4:
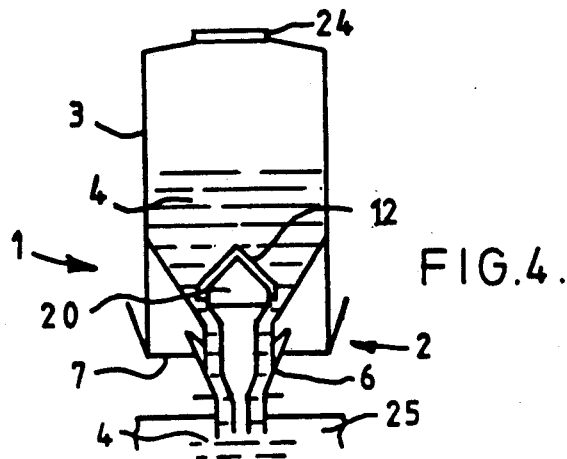
FIG. 4 is a schematic elevational view similar to that of FIG. 3, with the discharge station operative to discharge material from the I.B.C.
Figure 4B:
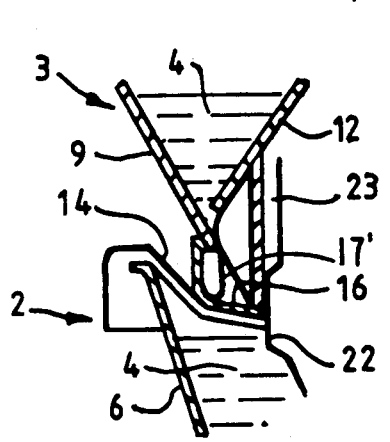
FIG. 4B is an enlarged view of the circled part of FIG. 4A which itself is a view of the system of FIG. 4 when discharge has ceased.
Figure 4A:
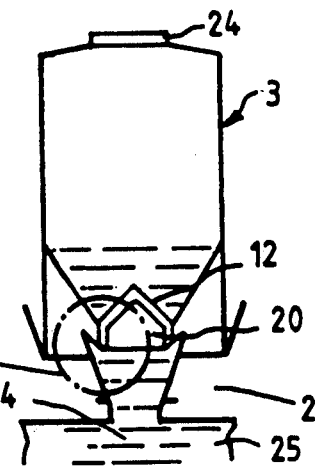
Figure 5A:
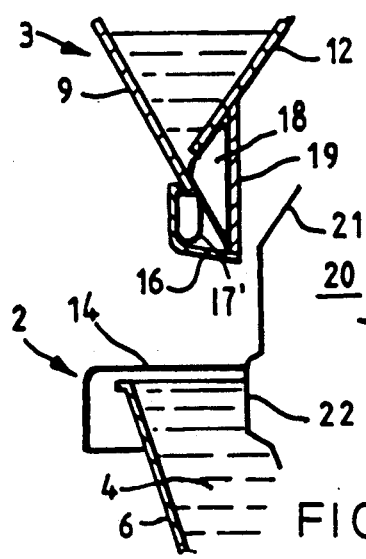
FIG. 5A is an enlarged view of the circled part of FIG. 5.
Figure 5:
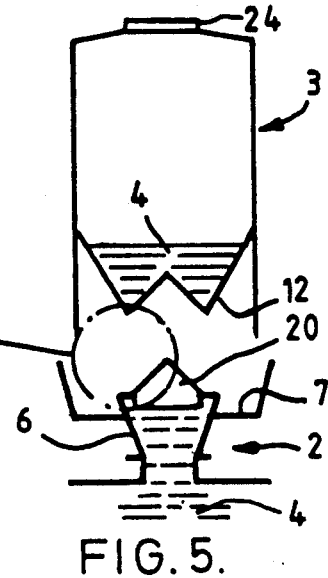
FIG. 5 is a schematic side elevational view of the system with the I.B.C. being removed from the discharge station.

In use of the system 1, and referring to the sequence of operations of the embodiments shown in FIGS. 2 to 5A, though it will be understood that the embodiment of FIGS. 1 to 1B operates in a similar way, assuming that the station 3 has been charged at a remote location with a flowable material such as a pharmaceutical powder 4, the powder 4 is sealed in the bin by the cone 12 and by a suitable sealed lid 24. If it is desired to dose or discharge some of the powder 4 from the station 3, that station 3 is transported to the discharge station 2. At the discharge station 2, the lifting device 20 is in a lower or inoperative position with the lip seal 14 of the chute or hopper 6 substantially horizontal and engaging the external surface of the wall or skirt 22 of the cone 21. In order to effect discharge of the powder 4, the station 3 is lowered onto the discharge station 2, by a fork lift truck whose forks are engaged in the feet 8 so that the lower edge of the station 3 can be received by the framework 7 of the discharge station 2. As seating of the station 3 on the station 2 takes place, the flexible and resilient outlet seal 16 at the free edge 9 of the station 3 engages and seals against the flexible and resilient hopper 6 lip seal 14, to form a cooperable or laminate or multi-leaf seal as shown in FIGS. 1A, 3A, 3B and 4B. At the same time, the lifting device 20, or probe, remains sealed within the hopper lip seal 14 which butts firmly against its outer periphery over its whole circumference. A switch or suitable actuating mechanism (not shown) also activates the source to inflate the pneumatic seal 23 so that it expands and seal against the interior of the wall 19 of the cone 12 of the station 3 so that the lower external (in use) surface of the cone is isolated from the outside. Thus when the station 3 is completely lowered and is in position on the station 2, the interior of the station 3, and hence the powder 4, is completely isolated from the exterior of the system by the seals 14 and 16 being in sealing engagement with one another and with the wall 19 and wall 22, by the pneumatic seal 23 sealing the interior of the cone 12 and the exterior of the cone 21 to the powder 4, and the soft sponge seal 18 sealing against the interior of the throat 9 of the station 3 (FIG. 3B). If now it is desired to dose and discharge powder 4 from the station 3 the vibratory lifting device 20 is actuated by air from the air source to raise the probe or cone 21 and this action automatically raises the cone 12 too, so creating an annular passage between the periphery of the cone 12 and the wall 9 of the station 3 and thus a path from the interior of the station 3 by way of the passage past the lifting device 20 into the discharge station, as shown in FIG. 4 where the discharge station 2 is shown in communication with a further receptacle 25. A vibrator carried by the cone 21 is also activated by the air source and vibrates the cones 12 and 21 and the powder 4 to ensure a smooth, controlled outflow through the annulus without bridging or rat-holing. During this flow the material 4 passes the free inner edge of the superposed seals 14 and 16 which are held tightly together and which seal the outlet of the station 3 and the inlet to the station 2 against egress of powder externally of the system 1. When the required amount of powder 4 has been dosed, the lifting device 20 is deactivated so that the cone 21 and cone 12 descend rapidly under the weight of material 4, above the cone 12, and under gravity to reseal both the outlet of the station 3 and the inlet of the station 2. The seals 14 and 16 ensure during the dosing and discharge operation that the mating outer surfaces of the station 3 and of the station 2 are completely clean and free from dust. The pneumatic seal 23 of the cone 21 is then automatically deflated as the interior of the cone 12 (the external surface in use) is now completely sealed against communication with the outside by the seals 14, 16 and 18. If now the station 3 is to be removed to another location it is raised off the station 2; the seal means 14, 16 are initially in contact and flex upwardly as viewed under the inherent resilience whilst remaining in sealing engagement with the external peripheral surface of the wall 22 of the lifting device 20. As the station 3 is raised further, the seal 16 is separated from the seal 14 which latter seal is then horizontal as viewed and still in sealing engagement with the external surface of the lifting device 20 while the former 16 flexes upwardly to seal against the free edge of the wall 19 of the cone 12 and thus seal the space below the seal 18, which might be contaminated with powder or dust therefrom. It will be understood that the underside (as viewed) of the seal 16 is 'clean' as it was protected against contact with the material 4 by the seal 14. There is thus no dust exposed to the environment using a system 1 as hereinbefore described with reference to the drawings, the underside of the cone 12, and the top of the station 2 being completely clean and free of dust as the stations 2 and 3 are completely sealed at all times. Stated in another way, the surrounding atmosphere is protected against contamination and the material 4 is effectively contained at all times interiorly of the system 1, and exposure of the external surfaces of the system to the material 4 is obviated.

The sealed door 24 may be replaced by a seal means like the one 5 described at the outlet 10 for use where another bin is stacked thereon, or where the bin 3 is a storage silo or hopper rather than a transportable bin for receiving a further bin which is transportable.

It will also be understood that the station or bin 3 may be lifted and lowered by lifting tackle such as an overhead crane rather than by a forklift truck. The seals 5, 18 and 23 though, operate in an identical manner in such a system.

I claim:

1. A system for handling flowable particulate material, comprising:
   a discharge station having inlet chute means for receiving the particulate material into the discharge station,
   a transportable container body adapted to internally receive the particulate material for transport to said discharge station,
   said container body having a discharge throat with a peripheral edge defining an outlet opening from said container body, and being mountable on said discharge station with said outlet opening in communication with an inlet opening of said inlet chute means,
   a displaceable valve member disposed within said container body and having a closed position in which a seal is created along a marginal portion of said valve member to block discharge of the particulate material through said outlet opening during transport of the container, and an open position in which said valve member allows discharge of the particulate material through said outlet opening, said valve member having a surface portion bounded by said marginal portion and which is exposed to the ambient environment during transport of said container body,
   first seal means cooperable between said valve member and said container body when said valve member is in said closed position for sealingly isolating said marginal portion of said valve member and said peripheral edge of said discharge throat from the ambient environment during transport of said container body, said first seal means having an external surface which is exposed to the ambient environment during transport of said container body,
   second seal means cooperable between said discharge station and said valve member for sealingly isolating said surface portion of said valve member from the particulate material during discharge of the particulate material from said container body to said inlet chute means, and
   third seal means cooperable between said discharge station and said first seal means for sealingly isolating said external surface of said first seal means from the particulate material during discharge of the particulate material from said container body to said inlet chute means.

2. A system according to claim 1, wherein said valve member includes a projecting wall extending along a circumference of said valve member, and said first seal means includes a seal member secured and circumferentially sealed to said container body near said peripheral edge of said discharge throat and having a portion circumferentially sealing against said projecting wall.

3. A system according to claim 1, wherein said valve member includes a projecting wall extending along a circumference of said valve member, and said second seal means includes a seal member of said discharge station inflatably expandable into circumferential sealing engagement with said projecting wall.

4. A system according to claim 1, wherein said third seal means includes a resilient seal member disposed to sealingly engage said external surface of said first seal means when said container body is mounted upon said discharge station.

5. A system according to claim 4, wherein said discharge station includes lifting means extending through said inlet opening of said inlet chute means for moving said valve member from said closed position to said open position, and said seal member of said third seal means is secured about a peripheral edge defining said inlet opening of said inlet chute means and has a portion sealingly engaging said lifting means circumferentially about said lifting means.

6. A system according to claim 5, wherein said seal member of said third seal means is sealingly engaged by said external surface of said first seal means and resiliently displaced into said inlet chute means by such engagement when said container body is being mounted on said discharge station.

7. A system according to claim 6, wherein said seal member of said third seal means maintains sealing engagement with and circumferentially about said lifting means as said seal member of said third seal means is displaced into said inlet chute means.

* * * * *

UNITED STATES PATENT AND TRADEMARK OFFICE
CERTIFICATE OF CORRECTION

PATENT NO. : 5,036,894
DATED : August 6, 1991
INVENTOR(S) : Ivan Semenenko It is certified that error appears in the above-identified patent and that said Letters Patent is hereby corrected as shown below:

ON THE TITLE PAGE:
  Item "[73] Assignee":

"Matcom" should read --Matcon--.

Signed and Sealed this

Twelfth Day of January, 1993

Attest:

DOUGLAS B. COMER

*Attesting Officer*      *Acting Commissioner of Patents and Trademarks*